Feb. 7, 1961  J. WORDSWORTH  2,970,831
VEHICLE HYDROPNEUMATIC SUSPENSION UNITS
Filed Feb. 21, 1958  5 Sheets-Sheet 1

INVENTOR
JACK WORDSWORTH
BY
Mead, Browne, Schuyler + Beveridge
ATTORNEYS

Feb. 7, 1961     J. WORDSWORTH     2,970,831
VEHICLE HYDROPNEUMATIC SUSPENSION UNITS
Filed Feb. 21, 1958     5 Sheets-Sheet 2
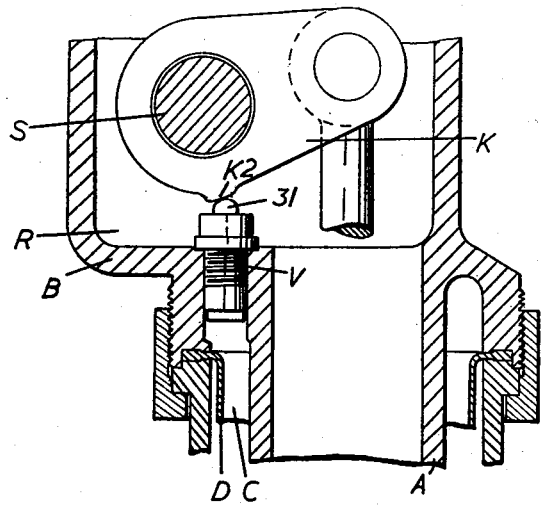
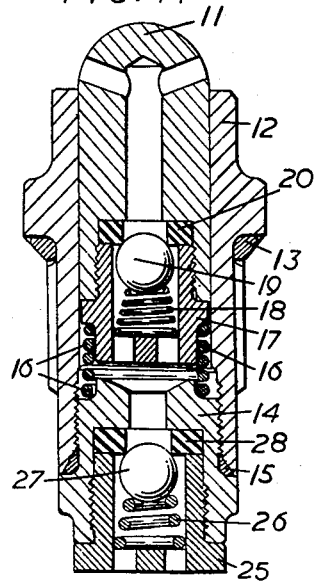
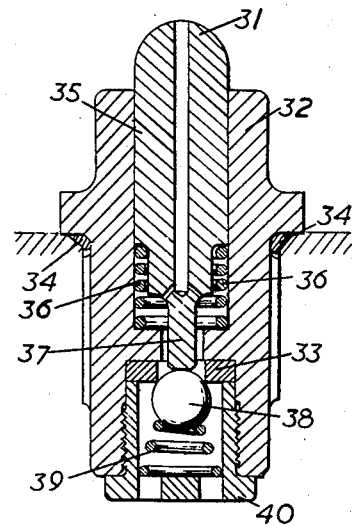
INVENTOR
JACK WORDSWORTH Feb. 7, 1961   J. WORDSWORTH   2,970,831
VEHICLE HYDROPNEUMATIC SUSPENSION UNITS
Filed Feb. 21, 1958   5 Sheets-Sheet 3
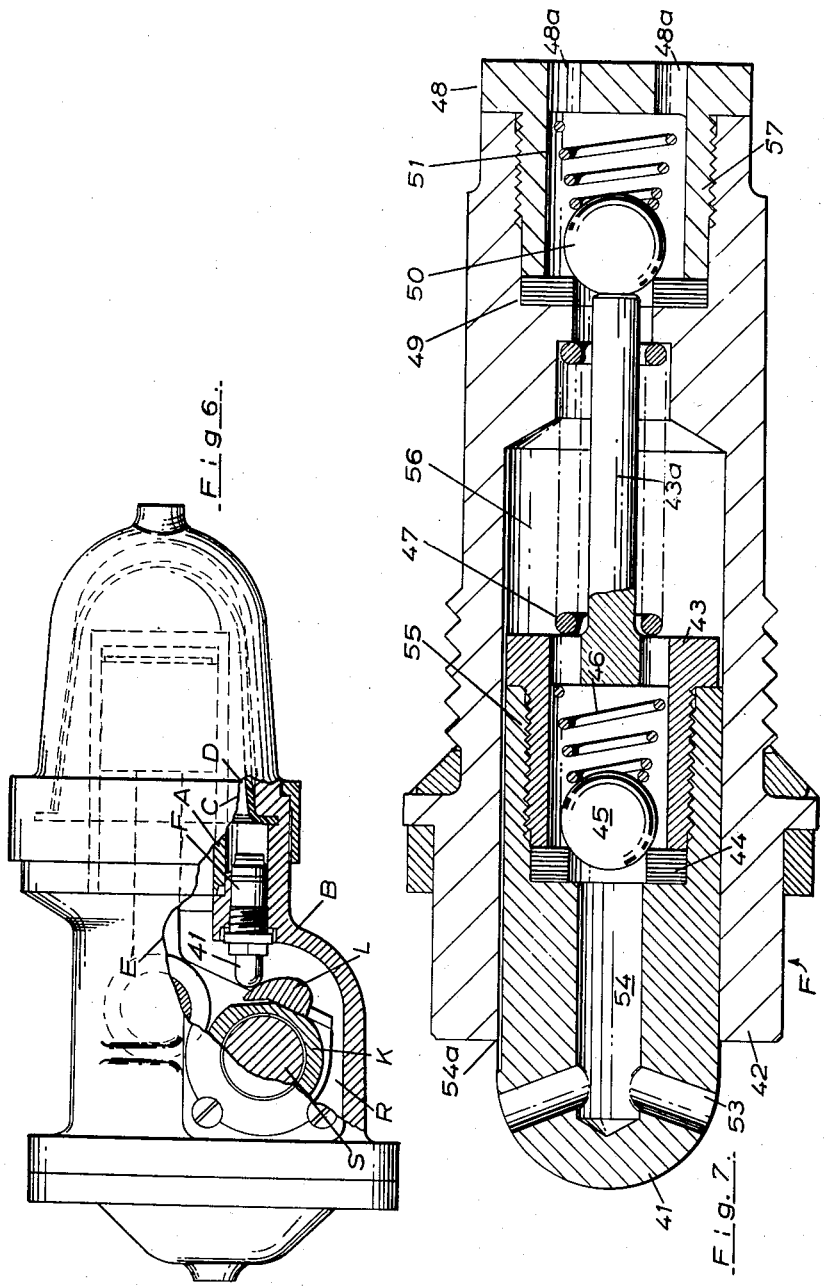
INVENTOR
JACK WORDSWORTH
BY
ATTORNEYS Feb. 7, 1961    J. WORDSWORTH    2,970,831
VEHICLE HYDROPNEUMATIC SUSPENSION UNITS
Filed Feb. 21, 1958    5 Sheets-Sheet 4
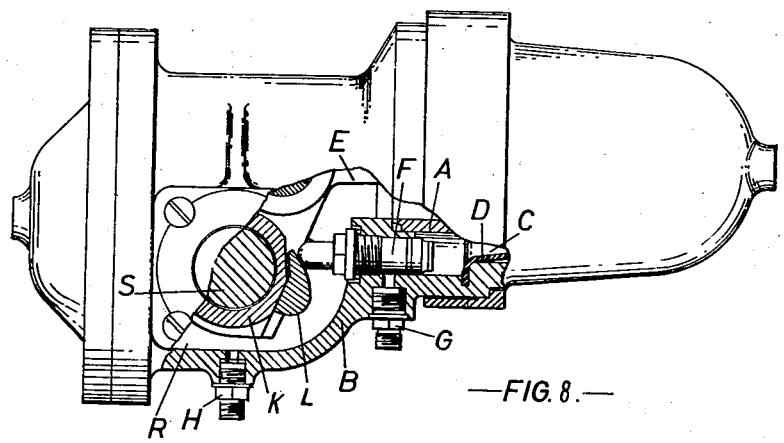
—FIG. 8.—
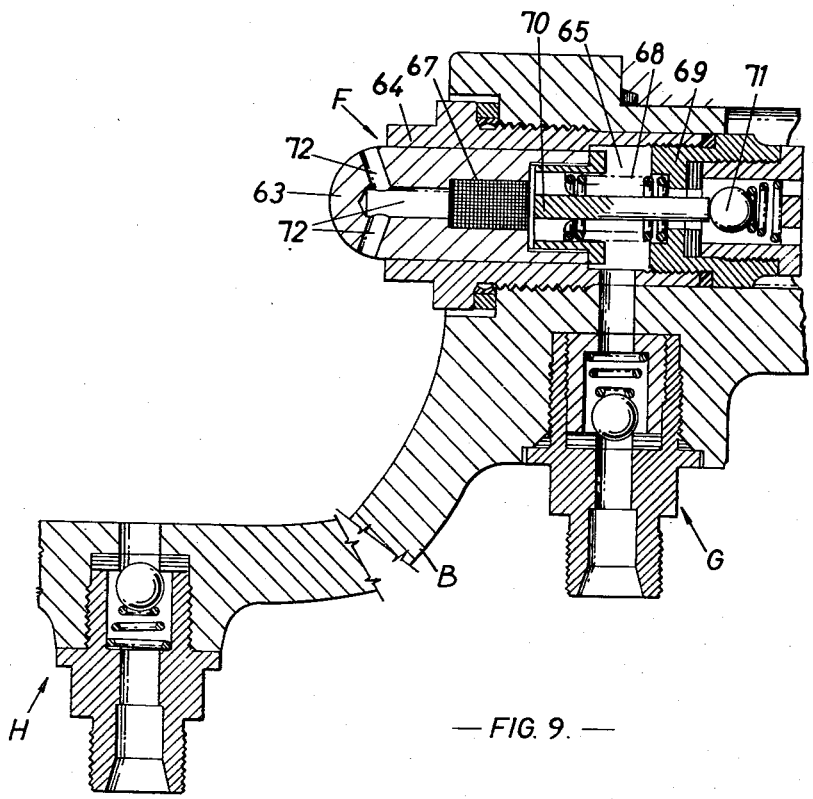
— FIG. 9. —
INVENTOR
JACK WORDSWORTH Feb. 7, 1961 J. WORDSWORTH 2,970,831
VEHICLE HYDROPNEUMATIC SUSPENSION UNITS
Filed Feb. 21, 1958 5 Sheets-Sheet 5
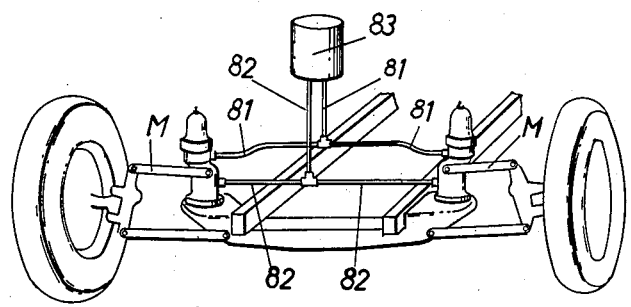
—FIG. 10.—
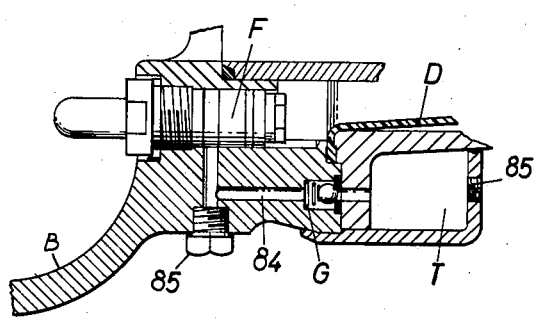
—FIG. 11.—
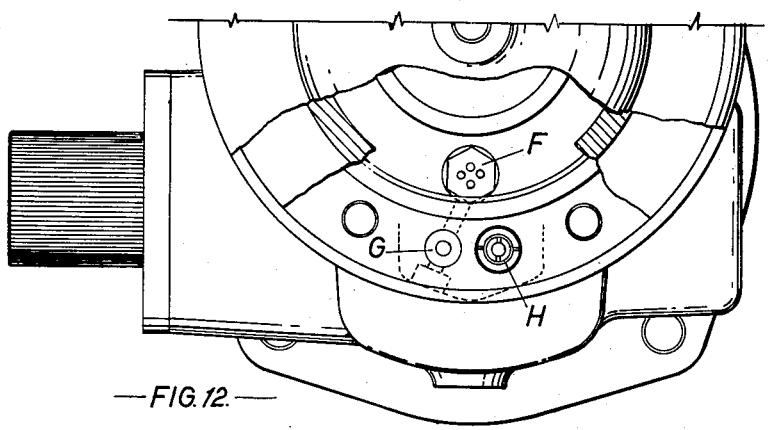
—FIG. 12.—
INVENTOR
JACK WORDSWORTH
BY
ATTORNEYS

2,970,831

VEHICLE HYDROPNEUMATIC SUSPENSION UNITS

Jack Wordsworth, York, England, assignor to Armstrong Patents Co. Limited, Beverley, England, a British company Filed Feb. 21, 1958, Ser. No. 716,774

Claims priority, application Great Britain Feb. 23, 1957

11 Claims. (Cl. 267—15)

This invention concerns combined pneumatic spring and shock absorber units, now more usually called hydro-pneumatic suspension units, for use in vehicle suspension systems.

A vehicle hydro-pneumatic suspension unit of the type to which the invention relates is one wherein the functions of the conventional suspension spring and shock absorber usually associated with each wheel mounting are combined within a single unit, in such a manner that at least part of the load is supported by the reaction of fluid in a confined space. Generally in such units the load exerted on a confined volume of hydraulic medium by a piston displaceable responsive to vehicle riding movements is balanced by the pressure of a mass or cushion of gaseous medium, usually air, against which the hydraulic medium acts, said gaseous medium thus serving as a pneumatic suspension spring.

In vehicle suspension systems employing suspension units of this nature, the relative attitude, either at rest or in smooth motion, of the vehicle frame and a wheel, is a function of the load and of the static pressure obtaining within the confined fluid. In other words, similarly to a conventional spring suspension, the frame sinks towards the wheel with increased loading, and rises into a relative attitude more remote from the wheel if the load is reduced.

It is a principal object of the invention to provide in a hydro-pneumatic suspension unit, or in a vehicle suspension system embodying the same, means responsive to a change in loading for automatically restoring the frame and wheel to, or causing them to approach, a desired relative attitude.

It is another object of the invention to provide in a hydro-pneumatic suspension unit, means for maintaining the piston in a predetermined means position under varying conditions of load applied thereto.

Another object of the invention resides in the provision in a hydro-pneumatic suspension unit, of means for varying the volume of hydraulic medium acted upon by the piston, whereby to enable adjustment to be made of the attitude of the piston relative to a vehicle wheel mounting. A related object of the invention is to enable the attitude of the piston to be held substantially constant relative to its associated wheel mounting thereby enabling a substantially constant riding height to be imparted to a vehicle.

Further objects of the invention are to provide automatic compensation for the effects attendant on pressure and temperature changes within the hydraulic medium, and for parasitic bleed conditions tending to change the quantity of confined hydraulic medium, and to improve the general riding characteristics imparted by a vehicle suspension system.

According to the present invention a hydro-pneumatic suspension unit of the type described includes means for increasing the quantity of confined fluid reacted upon by the load, on prolonged displacement in the load induced direction of a member movable, with up and down movement of the wheel, relative to a member fixed in its relation to the vehicle, and means for reducing said quantity on each prolonged displacement of said movable member in the opposite direction.

Preferably the said increasing means is a pump and the said reducing means a valve.

The said fixed member may consist in a part of the suspension unit body and may carry the pump and valve bodies, while the said movable member may be a cam having surfaces adapted to co-operate with plungers of the pump and valve respectively.

The pump and valve may conveniently be combined in a single assembly, for example comprising a pump plunger displaceable in phase with displacements of the piston and received within a housing formed with a pump chamber to which, by way of an inlet valve, hydraulic medium drawn from a reservoir thereof is passed on induction strokes of said plunger, the housing having an outlet valve communicating with said confined space and adapted to open during pumping strokes of said plunger, to enable the hydraulic medium from the pump chamber to be transferred to said confined space, said assembly also incorporating means responsive to piston position within the cylinder for opening said outlet valve to permit flow of hydraulic medium from said confined space.

In such a combined pump and valve assembly, the inlet valve may conveniently be carried by the plunger itself, and the plunger may be formed with bores communicating with the reservoir of hydraulic medium, the outlet valve being arranged in a region of the housing remote from said plunger.

Preferably the piston and the plunger are both reciprocated from a common source within the unit, and said source is provided with cam means arranged, when the piston assumes a desired mean position within its cylinder, to cause a striker carried by the plunger to bear upon and open the outlet valve.

Hydraulic medium exhausting from the confined space may advantageously pass back to the reservoir by way of the pump chamber, and thence via a restricted groove in the outer face of the plunger, thus by-passing the inlet valve.

According to another feature of the invention, the pump may draw additional hydraulic medium from a separate reservoir forming a part of a vehicle suspension system incorporating the suspension unit, and the relief valve may conveniently exhaust excess hydraulic medium to a low pressure chamber in the unit, the low pressure chamber then preferably including a blow-off valve by means of which hydraulic medium may be returned to the reservoir when the pressure in said chamber exceeds a predetermined maximum value. Thus, the provision of a reservoir ensures that all suspension units in a given suspension system are, at all times, kept fully primed with hydraulic medium, any leakage or bleeding being made good from the reservoir by means of the pump. Moreover, the constant circulation of hydraulic medium around the system assists in keeping the temperature of said medium at a minimum. If desired, however, each suspension unit may be provided with its own integral reservoir, to which the blow-off valve is connected, and from which the pump draws hydraulic medium when required.

The invention will be described further, by way of example, with reference to the accompanying drawings, in which:

Figs. 2 and 3 are fragmentary sections on the lines II—II and III—III respectively of Fig. 1;

Figs. 4 and 5 are details, in section and on an enlarged scale of a pump and a valve respectively;

Fig. 6 is an elevation, partly in section, of another embodiment of hydro-pneumatic suspension unit embodying the invention;

Fig. 7 is a sectional detail, to an enlarged scale, of the combined pump and valve assembly incorporated in the unit shown in Fig. 6;

Fig. 8 is an elevation, partly in section, of a further embodiment of hydro-pneumatic suspension unit embodying the invention;

Fig. 9 is a sectional detail, to an enlarged scale, of a portion of the unit shown in Fig. 8;

Fig. 10 is a diagrammatic perspective view of a vehicle suspension system incorporating a pair of the units shown in Figs. 8 and 9;

Fig. 11 is a sectional detail, to an enlarged scale, showing a portion of a hydro-pneumatic suspension unit having an integral reservoir for hydraulic medium; and Fig. 12 is an end view, partly broken away, of a unit having an integral reservoir as shown in Fig. 11.

Figure 1:
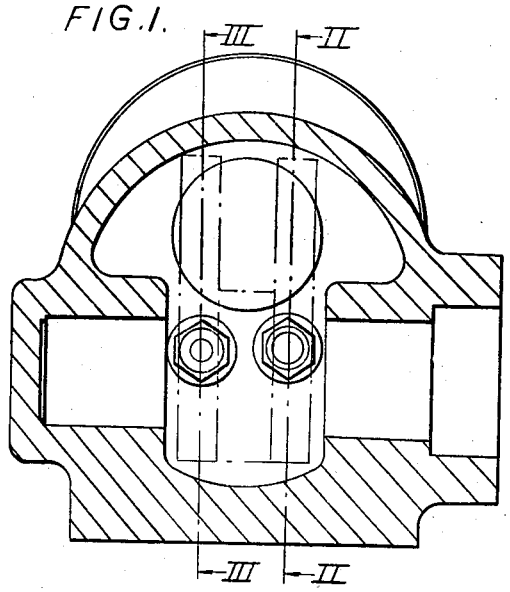
Fig. 1 is a section through the housing of a hydro-pneumatic suspension unit embodying the invention.
Figure 2:
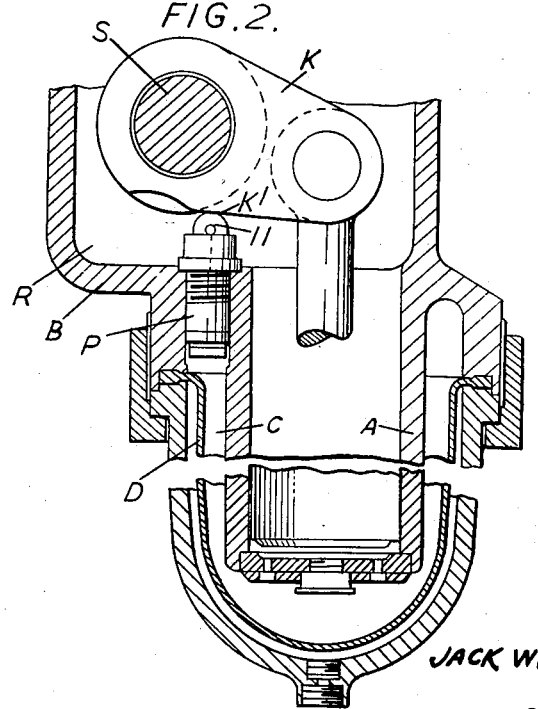

Referring firstly to the embodiment of Figs. 1 to 5 of the drawings, there is shown in Figs. 1 to 3 thereof a hydro-pneumatic suspension unit comprising a body B fixed to the chassis or frame of the vehicle and a semi-rotary shaft S journalled in the body B. The shaft S is adapted for connection through a lever (not shown) to a wheel mounting, whereby said shaft is rotarily displaceable responsive to vehicle riding movements.

The arrangement is such that oil partially fills a reservoir R in the body portion of the unit surrounding the shaft S, and by action of the load exerted on the shaft, oil is placed under pressure, in a confined space C outside a cylinder A embraced and closed at one end by a diaphragm D, by means of a piston (not shown) arranged in the cylinder and to which the shaft S is connected through a crank K and a connecting rod. An enclosed space outside the diaphragm D contains compressed air acting as a pneumatic spring.

A means for increasing the quantity of oil confined within the diaphragm consists of a pump P which includes a plunger 11 adapted to be depressed on each occasion that the shaft S rotates clockwise to bring a cam face K1 on the crank K into contact with the plunger 11 so as to effect operative displacement thereof. Likewise a means for reducing the quantity of confined oil consists of a relief valve V having a plunger 31 adapted to be depressed on each occasion that the shaft S rotates anti-clockwise to cause a cam face K2 on the crank K to contact with the plunger 31 to effect operative displacement thereof.

The specific construction of the pump P and of the valve V will be evident from Figs. 4 and 5 respectively.

The pump (Fig. 4) comprises an internally cylindrical body 12 screwed into a tapped bore in the suspension unit body B and sealed relative thereto by a sealing ring 13. Below the pump body 12 is a non-return valve body 14 fitting partly within and sealed relative to the pump body by a sealing ring 15. A pump plunger return spring 16 extends between the upper end region of the non-return valve body 14 and a recuperation valve chamber 17 containing a recuperation valve spring 18 and a recuperation valve ball 19. The ball 19 is normally seated on a recuperation valve washer 20 at the lower end of a bore in the pump plunger 11, which is displaceable in the bore of the body 12.

A non-return valve chamber 25 is fitted within the non-return valve body 14 and contains a non-return valve spring 26 and non-return valve ball 27 which is normally seated on a non-return valve washer 28 disposed at the inner end of a bore in the non-return valve body 14.

The relief valve V (Fig. 5) comprises a body 32 formed intermediate its ends with a short, relatively small diameter axial bore. One end region of the body 32 is counterbored to provide a plunger cylinder and the opposed end region is counterbored to provide a seating for a valve washer 33. The body 32 is screwed into a tapped bore in the suspension unit body B and is sealed relative thereto by a sealing ring 34. The plunger 31 is axially bored, and at that end of the plunger which is innermost in the body 32, said axial bore terminates in a number of short, oblique bores. The plunger 31 is displaceable in the upper counterbore of the body 32. A return spring 36 is provided to urge the plunger 31 upwardly, and said plunger has a downwardly extending axial projection or striker 37 which passes through the washer 33 and is adapted to unseat a ball valve 38 normally urged against the washer 33 by a spring 39 which abuts against the inner end face of a valve chamber 40 extending within and fixed to the lower end portion of the body 32.

In operation of the hydro-pneumatic suspension unit described above, when fitted to a vehicle, riding movements of the vehicle wheel with which the unit is associated are transmitted to the shaft S and cause the cam K1 to oscillate the pump plunger 11. Hydraulic medium from the reservoir R is thus drawn through the recuperation valve 19, 20 and urged past the valve ball 27 into the confined space C. The consequent increase in volume of hydraulic medium in the space C in turn causes the piston of the suspension unit to move outwardly with respect to the cylinder, that is to say in such a direction as eventually to cause the cam K2 to become incident upon or to contact and just depress the plunger 31 of the relief valve V. When this occurs, the valve ball 38 is just unseated by the striker 37, and hydraulic medium is allowed to pass from the space C back to the reservoir, by way of the oblique and axial bores in the plunger 31. In continued travel of the vehicle, constant pumping of hydraulic medium into the confined space C by the pump P, balanced by constant or continually recurring exhaust of hydraulic medium by the valve V, serves to maintain the piston in a desired mean position intermediate the ends of the cylinder. Thus the shaft S and its connection to a wheel mounting are maintained in a desired attitude relative to the vehicle frame or chassis, that is to say, the vehicle frame or chassis is maintained at a substantially constant riding height, which, it will be appreciated, is determined by the location of the cam K2 relative to the plunger 31.

If now the load on the vehicle is increased, the chassis or frame, as in a conventional spring suspension, will sink towards the wheels. Through its connection to the wheel mounting, the shaft S will thus be angularly displaced in a clockwise direction, and will cause the piston to enter further into the cylinder of the suspension unit. The invention, however, now acts to restore the aforementioned substantially constant riding height in that the said displacement of the shaft S moves the cam K2 away from the plunger 31, allowing the valve V to close, but further travel of the vehicle results in continued operation of the pump P by the cam K1. The volume of hydraulic medium in the confined space C is therefore increased until the piston has once more moved outwardly of the cylinder, to the position where the cam K2 again becomes effective to just open the relief valve V. Conversely, if the load carried by the vehicle is reduced, the shaft S is allowed to rotate in an anti-clockwise direction, and the piston is caused to move outwardly of the cylinder, but then the cam K2 becomes effective to hold the valve V open until sufficient hydraulic medium has exhausted from the confined space C to restore the piston to its predetermined mean position.

In Figs. 6 and 7 of the drawings, there is shown an embodiment of the invention wherein the pump and the relief valve are combined in a single assembly. The hydro-pneumatic suspension unit in these figures again comprises a body B adapted for fixing to the chassis or frame of a vehicle, and a semi-rotary shaft S journalled in the body B, the shaft S being adapted for connection through a lever (not shown) to a vehicle wheel mounting. The arrangement in this embodiment of the invention is also such that hydraulic medium at least partially fills a low pressure chamber R constituting a reservoir in the body portion surrounding the shaft S, and by the action of the load, hydraulic medium is subjected to pressure, in a confined space C defined between the outside of a cylinder A and a flexible diaphragm D surrounding said cylinder, by means of a piston (not shown) connected to the shaft S by a connecting rod E and a crank K. An enclosed space outside the diaphragm D contains compressed air acting as a pneumatic suspension spring.

The suspension unit is provided with a combined pump and relief valve assembly F for respectively increasing and decreasing the amount of hydraulic medium confined in the space C, the pump section of the assembly communicating with the reservoir R.

With particular reference now to Fig. 7 of the drawings, the combined pump and valve assembly includes a plunger 41 slidingly received in a bore therefor formed in a body 42, which is adapted for mounting in the suspension unit as shown at F in Fig. 6. The outer free end of the plunger 41 is formed with a plurality of bores 53, 54 adapted to communicate with the reservoir R, and within the plunger 41 the bore 54 is counterbored to receive a valve seat 44 on to which a ball valve member 45 is resiliently urged by means of a spring 46. This spring 46 is in turn carried within one end region of a striker member 43 secured to the plunger 41. The other end region of the striker 43 extends into an elongated striker portion 43a the purpose of which will hereinafter more fully be described. The seat 44, valve member 45 and spring 46 together constitute a pump inlet valve carried by the plunger, and generally denoted by the reference numeral 55.

At the end of the body 42 remote from the plunger 41, there is arranged a pump outlet valve generally denoted 57, and comprising a seat 49 against which a ball valve member 50 is resiliently urged by means of a spring 51. The seat 49, valve member 50 and spring 51 are arranged and held in position by means of a plug 48 received within the housing 41 and formed with bores 48a communicating with the confined space C.

When the assembly shown in Fig. 7 is incorporated in the suspension unit of Fig. 6, it will be observed that the plunger 41 is contacted by a cam L carried on the crank K, and hence when the vehicle is in motion, the plunger 41 is continually reciprocated within its bore in the housing 42. On each outward movement of the plunger 41 from the housing 42, hydraulic medium is drawn through the bores 53, 54 to open the valve 55 and enter a pump chamber 56 formed within the housing 42. On the subsequent inward or pumping stroke of the plunger 41 this hydraulic medium is then placed under pressure to open the valve 57 and pass by way of the bores 48a to the confined space C. As the volume of hydraulic medium confined within the space C increases, the piston in the suspension unit is urged outwardly of the cylinder A, that is to say to the left as shown in Fig. 6 of the drawings, and this in turn, by way of the connecting rod E and crank K results in anticlockwise movement of the semi-rotary shaft S, this movement being arranged to raise the vehicle chassis or frame relative to the road wheels.

In order to define a mean position of the piston within the cylinder A and hence to determine a desired riding height substantially at which the vehicle may constantly be maintained, the cam L and striker portion 43a of the striker member 43 are so dimensioned and proportioned that when that desired mean position is attained by the piston, the striker portion 43a is incident upon and just contacts the ball valve member 50, as shown in Fig. 7, to lift that valve member from its seat 49 and permit hydraulic medium to exhaust from the confined space C, the valve 49, 50 thus acting as a relief valve. Hydraulic medium flowing in this way from the confined space C passes into the pump chamber 56 and thence, via a flow restricting means comprising a restricted groove 54a formed externally in the plunger 41, back into the reservoir R. Thus, continual pumping allied to intermittent, i.e. continually recurring, relief in the manner described will ensure that the piston is maintained in its desired mean position.

It will be appreciated that by virtue of the combined pump and valve assembly described, if the load carried by a vehicle is increased, hydraulic medium is added to the confined space C until the piston has been restored to its mean position. Conversely, if the load carried by a vehicle is reduced, the piston will move outwardly of its cylinder A, the cam L will cause the striker portion 43a to open the valve 57, and hydraulic medium will exhaust from the confined space C until once again the piston has been restored to its mean position.

Referring now to Figs. 8 and 9 of the drawings, there is therein shown another embodiment of hydro-pneumatic suspension unit proposed by the invention, and again comprising a body B adapted for fixing to the chassis or frame of a vehicle, together with a semi-rotary shaft S journalled in the body B, the shaft S being adapted for connection through a lever M (Fig. 10) to a wheel mounting.

The arrangement is once again such that hydraulic medium at least partially fills a low pressure chamber R in the body portion surrounding the shaft S, and by the action of the load, hydraulic medium is compressed in a confined space C, defined between the outside of a cylinder A and a flexible diaphragm D surrounding the cylinder, by means of a piston (not shown) connected to the shaft S by a connecting rod E and a crank K. An enclosed space outside the diaphragm D contains compressed air acting as a pneumatic spring.

This embodiment of the invention is provided with an alternative construction of combined pump and relief valve F for respectively increasing and decreasing the amount of hydraulic medium confined in the space C, the pump section of the combination being adapted to communicate via a recuperation valve G with a hydraulic medium reservoir 83 (Fig. 10) of a vehicle suspension system of which the unit may conveniently form a part. The recuperation valve G will be seen to be separately arranged in the body B of the suspension unit itself. Thus the pump section of the combination F is enabled, when so required, to draw additional hydraulic medium from the reservoir 83 for transfer through a delivery pipe 81 and the valve G to the confined space C, whilst the valve section of the combination is arranged to communicate, via the pump itself, with the low pressure chamber R, to which excess hydraulic medium from the space C may be exhausted. The low pressure chamber R is provided with a blow-off valve H arranged to open at a predetermined pressure and to pass hydraulic medium from the chamber R through a return pipe 82 back to the reservoir 83.

Referring now more particularly to Fig. 9, the combined pump and valve F will be seen to include a main body 64 in which is housed a sliding pump plunger 63 urged outwardly of the body 64 by means of a spring 68. This spring 68 bears at one end against a recessed end portion of the plunger 63, and at the opposed end against a body 69, engaged in the end of the main body 64 remote from the plunger 63, and housing a non-return pump outlet valve 71. The non-return valve 71 opens directly (Fig. 8) into the confined space C.

At its free, outer end, the plunger 63 bears against a cam L carried on the crank K, and the cam surface is so formed that clockwise movement of the semi-rotary shaft S, corresponding to a movement of the lever M in the weight-acting or bump direction, results in outward movement of the plunger 63. As a consequence of this outward movement of the plunger, a charge of hydraulic medium is drawn into the pump chamber 65, and on subsequent movement of the shaft S in an anti-clockwise sense, corresponding to a movement of the lever M in a rebound direction, this charge of hydraulic medium is placed under pressure by the plunger 63 to open the valve 71 and pass to the confined space C.

Beyond a predetermined limiting position of anti-clockwise movement, however, the ball valve 71 is contacted by a striker 70 carried by the plunger 63, which lifts the valve 71 from its seat and allows hydraulic medium from the confined space C to re-enter the pump chamber 65. From the pump chamber 65, since the valve G is a non-return valve closing the delivery pipe 82, the hydraulic medium passes through a filter 67, or other suitable liquid flow restrictor, and via ducts 72 formed in the plunger 63 to the low pressure chamber R.

For operation of this embodiment of suspension unit, the desired normal riding height of the vehicle having been chosen, thus determining the normal relative attitude of the semi-rotary shaft S and the piston within the unit, the shape of the cam L and the location of that cam on the crank K are so arranged that, at said normal riding height, the striker 70 just abuts the valve 71. If now the load on the vehicle is increased, the shaft S and cam L are displaced in a clockwise direction, and the plunger 63 moves outwardly of the main body 64. At the same time, the connecting rod E and the piston within the suspension unit are moved inwardly of the cylinder A away from the mean position which the piston occupies at normal riding height. Vehicle travel subsequent to the above-described circumstances, however, results in oscillation of the semi-rotary shaft S due to the usual wheel suspension movements encountered during travel, and hence results in oscillation of the pump plunger 63 and transfer of hydraulic medium from the reservoir 83 through the recuperation valve G into the confined space C. The addition of hydraulic medium into the space C causes the piston to move outwardly again, towards its mean position, and when that position is reached, the striker 70 intermittently opens the relief valve 71 to render further pumping action of the plunger 63 ineffective and to maintain the piston in its mean position. This outward movement of the piston, of course, causes anti-clockwise movement of the shaft S to restore the vehicle to its normal riding height, and thus the effect of the combined pump and valve device F is to act as a self-levelling or height-correcting means.

Conversely, if load is subtracted from the vehicle, the shaft S is displaced in an anti-clockwise direction, whereby the cam L moves the plunger 63 forwardly until the striker 70 opens the relief valve 71 to allow hydraulic medium to pass from the confined space C through the filter or the like restriction 67 to the low pressure chamber R. The release of hydraulic medium from the space C thus allows the weight of the vehicle to act to compensate for previous outward movement of the piston due to the said anti-clockwise movement of the shaft S, and to restore the piston to its mean position.

The combined pump and valve F further imparts desirable riding characteristics to the suspension unit of the invention in that, in a laden condition of the vehicle, a greater volume of hydraulic medium is present in the confined space C than when the vehicle is unladen; hence the bump cushioning effect is heightened when the vehicle is laden. Moreover, towards the limit of rebound movement of the shaft S, when the striker 70 has opened and is holding open the valve 71, the resulting release of hydraulic medium from the space C reduces the residual pressure on the front of the piston within the unit. This decrease in pressure to the fore of the piston, allied to an increase in pressure in the chamber R due to outward movement of the piston, in the case when the chamber R is completely filled with hydraulic medium, reduces the tendency of the suspension to strike the rebound stops. These features give good balance of performance under all conditions of loading.

Figs. 11 and 12 show a further embodiment of the invention in which each suspension unit is provided with its own integrally formed reservoir T. This reservoir T communicates, by way of ducts formed in the body of the unit, with the pump suction chamber 65 and with the low pressure chamber R, the duct 84 shown in Fig. 11 leading from the reservoir to the pump chamber, and a similar duct (not shown) leading from the low pressure chamber R to the reservoir. The recuperation valve G and blow-off valve H in this embodiment are conveniently also located in the body of the unit itself, immediately adjacent the reservoir, the general arrangement of the valve G being evident from Fig. 11, and the relative positioning of the two valves G and H with respect to one another being shown in Fig. 12. Charging of the reservoir T and the various ducts with hydraulic medium is effected by way of filler plugs 85.

It will be understood that, in all the embodiments of the invention herein described, the suspension unit may be provided with a second elastic diaphragm, similar to the diaphragm D and bounding the reservoir or low pressure chamber R on the side of the shaft S remote from the cylinder A, the said second diaphragm serving to confine between itself and the body B of the suspension unit, a second volume of compressed air or gas. In such a construction, the reservoir or low pressure chamber R is completely filled with hydraulic medium, and the said second volume of compressed air or gas acts as a pneumatic spring for rebound movements of the vehicle wheel imparted to the piston.

I claim:

1. A vehicle hydro-pneumatic suspension unit comprising a body adapted to be arranged between a vehicle frame and a wheel mounting, a cylinder extending within said body, a shaft journalled in said body for turning movement adjacent the cylinder, in response to vehicle riding movements, a piston arranged within said cylinder and reciprocable therein by turning movement of said shaft, a flexible diaphragm enclosing the end of said cylinder remote from said piston, said diaphragm defining with the free end of said piston, a confined space of variable volume, said confined space being filled with hydraulic medium, said diaphragm further defining with the body of the unit, an enclosed space bounding said confined space, said enclosed space being occupied by a compressed gaseous medium, cam means carried on said shaft, pump and valve means mounted in said body adjacent said cam means and communicating with said confined space, said body being formed with a reservoir for hydraulic medium, said cam means being operable upon a predetermined rotary displacement of said shaft in the load-induced direction to operate said pump to effect transfer of hydraulic medium from said reservoir to said confined space, said cam means being operable upon a predetermined rotary displacement of said shaft in the opposite direction to render said valve means effective to permit the return of excess hydraulic medium from said confined space to said reservoir.

2. In a vehicle hydro-pneumatic suspension unit as defined in claim 1, said pump and valve means comprising a generally cylindrical housing adapted for mounting within said body, said housing being formed intermediate its ends with a pump chamber communicating with said confined volume, a plunger slidingly received within said housing, said plunger being formed with an axial bore communicating at one end with said reservoir and at the other end with said pump chamber, an inlet valve carried by said plunger, resilient means urging said inlet valve into closing relationship with said axial bore, said cam means being arranged to reciprocate said plunger to effect transfer of hydraulic medium from the reservoir to the pump chamber, said inlet valve being adapted to open on induction strokes of said plunger, an outlet valve carried by said housing and arranged normally to close the communication between the pump chamber and said confined volume, said outlet valve being adapted to open on pumping strokes of said plunger, and striker means extending from said plunger towards said outlet valve and arranged to unseat said outlet valve when the plunger is displaced by said cam means to a predetermined position within said housing, said plunger being provided between the pump chamber and the reservoir, with a restricted fluid flow path adapted to permit excess hydraulic medium in the pump chamber to return to the reservoir.

3. In a hydro-pneumatic suspension unit of the type in which the load exerted by a piston working in a hydraulic cylinder on a volume of hydraulic medium confined in one end of said cylinder is balanced by a pneumatic spring, the improvement comprising an elastic diaphragm enclosing said one end of said cylinder, means defining a reservoir of hydraulic medium in communication with the other end of said cylinder, a spindle journaled in said unit for rotary oscillation adjacent said piston, means connecting said spindle to said piston to reciprocate said piston within said cylinder in response to rotary oscillation of said spindle, plunger operated fluid transfer means for transferring hydraulic medium in either direction between the respective ends of said cylinder, and cam means mounted upon said spindle and engageable with the operating plunger of said fluid transfer means to transfer hydraulic medium from said reservoir to said one end of said cylinder upon rotation of said shaft beyond a first selected rotary limit and to transfer hydraulic fluid from said one end of said cylinder to said reservoir upon rotation of said shaft beyond a predetermined second rotary limit.

4. A vehicle hydro-pneumatic suspension unit for supporting a vehicle frame upon a vehicle wheel mounting, comprising a hollow body member, a hydraulic cylinder extending from said body member and communicating with the hollow interior of said body member, said hollow interior constituting a reservoir for hydraulic medium, a shaft extending into the hollow interior of said body member and supported for turning movement in either of two directions with respect to said body member, a piston located within and displaceable within said cylinder, means connecting said piston to said shaft, said connecting means being operable to displace said piston within said cylinder responsive to turning movements of said shaft, an elastic diaphragm secured to said body member and enclosing the end portion of said cylinder which is remote from said body member, said diaphragm cooperating with said cylinder and the free end of said piston to define a hydraulic chamber, plunger operated fluid transfer means with said body member for transferring hydraulic medium in either direction between said hydraulic chamber and said reservoir, cam means on said shaft and engageable with the operating plunger of said fluid transfer means to transfer hydraulic fluid from said reservoir to said hydraulic chamber upon departure of said shaft in one direction from a predetermined angular relation with said body member and to transfer hydraulic fluid from said hydraulic chamber to said reservoir upon departure of said shaft in the opposite direction from said predetermined angular relation, and means secured to said body member exteriorly of said diaphragm and defining together with said diaphragm, a pneumatic chamber adapted to contain a pneumatic medium and thus constitute a pneumatic suspension spring.

5. A vehicle hydro-pneumatic suspension unit for supporting a vehicle frame upon a vehicle wheel mounting comprising a closed casing having a first and a second chamber therein interconnected with each other by a bore, a piston mounted in said bore in sliding sealing engagement with the wall thereof, pressure transmitting means dividing said second chamber into a first portion in communication with said bore and a second portion sealed from said first portion and adapted to be charged with gas under pressure, said first chamber and said first portion of said second chamber containing hydraulic medium, said casing being formed with a passage connecting said first chamber and said first portion of said second chamber, drive means including a spindle mounted for rotary oscillation in said first chamber and coupled to said piston to drive said piston within said bore toward said second chamber in response to upward movement of said wheel mounting relative to said frame and to drive said piston within said bore toward said first chamber in response to downward movement of said wheel mounting relative to said frame, cam means fixedly mounted on said spindle for rotation therewith, and means in said passage operable by said cam means for transferring hydraulic medium through said passage between said first chamber and said first portion of said second chamber to increase the amount of hydraulic medium in said first portion of said second chamber in response to upward movements of said wheel mounting relative to said frame exceeding a predetermined normal range of movement of said wheel mounting relative to said frame and to transfer hydraulic medium from said first portion to said first chamber in response to downward movements of said wheel mounting beyond said normal range.

6. A vehicle hydro-pneumatic suspension unit as defined in claim 5 wherein said means in said passage operable by said cam means comprises a pump including a pump plunger slideably received in the end of said passage adjacent said first chamber for reciprocation by said cam means, the central portion of said passage constituting a pump chamber, a one way pump outlet valve located in the end of said passage adjacent said first portion of said second chamber to normally block flow of hydraulic medium from said first portion into said pump chamber while permitting hydraulic medium to flow from said pump chamber into said first portion of said second chamber when the pressure of hydraulic medium within said pump chamber exceeds the pressure of hydraulic medium in said first portion of said second chamber, one way check valve controlled means for conducting hydraulic medium from said first chamber to said pump chamber to maintain a minimum pressure on hydraulic medium within said pump chamber, means on said plunger for opening said pump outlet valve to permit hydraulic medium to flow from said first portion of said second chamber into said pump chamber in response to downward movements of said wheel mounting beyond said normal range, and means defining a restricted flow passage for returning hydraulic medium from said pump chamber to said first chamber.

7. A vehicle hydro-pneumatic suspension unit as defined in claim 6 wherein said one way check valve controlled means comprises a first conduit having a one way check valve therein connected to said first chamber to define an outlet to said first chamber, a reservoir connected to said first conduit of said first chamber, a second conduit for conducting hydraulic medium from said reservoir to said pump chamber, and a one way check valve in said second conduit defining a pump inlet valve.

8. A vehicle hydro-pneumatic suspension unit as defined in claim 7 wherein said means defining a restricted flow passage for conducting hydraulic medium from said pump chamber to said first chamber comprises a passage extending through said pump plunger and means in said passage for restricting flow of hydraulic medium through said passage.

9. A vehicle hydro-pneumatic suspension unit as defined in claim 6 wherein said one way check valve controlled means comprises a supply passage extending through said pump plunger between said first chamber and said pump chamber, and a one way check valve in said supply passage for blocking said passage when the pressure within said pump chamber exceeds the pressure within said first chamber.

10. A vehicle hydro-pneumatic suspension unit as defined in claim 9 wherein said means defining a restricted flow passage for conducting hydraulic medium from said pump chamber to said first chamber comprises a restricted passageway extending between said pump plunger and the adjacent wall of said passage.

11. A vehicle hydro-pneumatic suspension unit as defined in claim 6 wherein said means on said plunger for opening said pump outlet valve comprises a projection extending from said plunger toward said pump outlet valve and operable upon movement of said plunger toward said pump outlet valve beyond a position of said plunger constituting the midpoint of said normal range of movement of said wheel mounting relative to said frame to open said pump outlet valve.

References Cited in the file of this patent

UNITED STATES PATENTS

| | | |
|---|---|---|
| 2,436,573 | Heynes | Feb. 24, 1948 |
| 2,802,664 | Jackson | Mar. 13, 1957 |
| 2,825,579 | Heiss | Mar. 4, 1958 |